United States Patent [19]

Fisli

[11] Patent Number: 5,479,289

[45] Date of Patent: Dec. 26, 1995

[54] METHOD AND APPARATUS FOR PREPARING IMAGED LIGHT

[75] Inventor: Tibor Fisli, Los Altos Hills, Calif.

[73] Assignee: Xerox Corporation, Stamford, Conn.

[21] Appl. No.: 277,813

[22] Filed: Jul. 20, 1994

Related U.S. Application Data

[63] Continuation-in-part of Ser. No. 964,246, Oct. 21, 1992.

[51] Int. Cl.$^6$ .................................................. G02B 26/00
[52] U.S. Cl. ........................................................ 359/290
[58] Field of Search .................................. 359/290, 291, 359/292, 295; 362/237, 238, 239, 259; 313/1, 500

[56] References Cited

U.S. PATENT DOCUMENTS

| | | | |
|---|---|---|---|
| 3,922,085 | 1/1975 | Sheets | 359/888 |
| 4,492,435 | 1/1985 | Banton et al. | 359/295 |
| 4,571,603 | 2/1986 | Hornbeck et al. | |
| 4,814,667 | 3/1989 | Tanaka | 313/500 |
| 5,072,239 | 12/1991 | Mitcham et al. | 359/291 |
| 5,096,279 | 3/1992 | Hornbeck et al. | 359/230 |
| 5,159,485 | 10/1992 | Nelson | 359/291 |

OTHER PUBLICATIONS

Electronics Engineer's Reference Book, 6th ed, Cornwall, Hartnolls Ltd., 1989, pp. 23/9–23–10, TK7825.E44,1989.

Primary Examiner—F. Daniel Lopez
Attorney, Agent, or Firm—Oliff & Berridge

[57] ABSTRACT

An imaging device and method for projecting imaged light according to print data onto an imaging medium includes a light source, an optics system receiving light from the light source, and at least one modulator having a plurality of individually addressable reflective elements. The optics system images or focuses the light source onto the at least one modulator and the at least one modulator selectively modulates a portion of the light onto the imaging medium according to the print data. The optic system includes a condenser lens positioned between the light source and the at least one modulator and an imaging lens be positioned between the at least one modulator and the imaging medium. A numerical aperture of the condenser lens is set to be equal to a numerical aperture of the imaging lens to critically illuminate the modulator. The light source may include a plurality of light emitting elements. Light beams from the plurality of light emitting elements are overlapped on the reflective elements at the full width half max point of the light beams to uniformly illuminate the reflective elements.

24 Claims, 5 Drawing Sheets

METHOD AND APPARATUS FOR PREPARING IMAGED LIGHT

This is a continuation-in-part of Application No. 07/964,246, filed Oct. 21, 1992.

FIELD OF THE INVENTION

The present invention relates to imaging printer devices. In particular, the invention relates to preparing imaged light for a printing device based on addressable mirror technology, in particular micromechanical spatial light modulators, for example, deformable mirror devices, also known as digital mirror devices.

BACKGROUND OF THE INVENTION

Micromechanical spatial light modulators (SLM) have recently been developed. One type of SLM has been termed "deformable mirror device" (DMD). However, the mirror device is not actually deformed. Instead, the mirror device is formed in a hinged architecture so that a reflective surface or mirror is tilted. Alternatively, a reflective surface of a mirror is formed on a torsion beam which is selectively rotated.

DMD modulators are monolithally integrated, silicon based devices manufactured with conventional CMOS processes using standard materials. The modulators consist of a single row or multiple rows of pixel mirrors, each pixel mirror being independently addressable.

U.S. Pat. No. 5,159,485 to Nelson discloses an optical system for illuminating a DMD array. Nelson uses a modified Kohler type illumination system with an anamorphic element in order to attempt to create uniform illumination. The Kohler optics is widely used in projection systems in transmission mode, where the film is placed in the converging light cone between the condenser lens and the projection lens in such a fashion that while the film is in the object plane of the projection lens, the condenser images the light source into the aperture of the (same) projection lens. While the Kohler system provides reasonable performance in a conventional film projection system, it suffers from the so called "cosine 4th" losses ( non-uniform illumination), and the application proposed by Nelson creates additional problems.

There are two basic requirements for acceptable digital image creation in a xerographic system: sufficient energy level and proper spot size. The former is a function of the power of the light source and the throughput efficiency of the optical system. The latter is controlled by the F/number, which in turn is the function of the "aperture size" and the focal length of the imaging optics ( diffraction limited optics assumed). Here the "aperture size" means the actually illuminated region of the physical lens opening.

In a conventional Kohler system, the size of the film ( negative or positive) is such that if it is placed in the light cone emerging from the condenser, it covers a very large part of it, thus most of the light energy will arrive in the aperture of the projection lens. Although the aperture will not necessarily be completely filled, the resolution of the image will be acceptable because these optical systems are rarely if ever diffraction limited.

In the system proposed by Nelson, the small ( aprox. 15 to 30 micron) pixels mirrors are acting as light path folding components in a converging cone. Therefore, as they direct the already small cross section of beam into an even smaller image in the aperture of the projection lens, the effective aperture of the projection lens will be too small to provide the F/# that is required for the desired spot size for high resolution printing.

SUMMARY OF THE INVENTION

An object of the present invention is to achieve an imager for preparing high contrast imaged light according to print data. Yet another object is to prepare the imaged light efficiently, at low cost and with a minimal number of components.

The present invention uses DMD modulators or another form of micromechanical spatial light modulator or light valves (operating either in reflective or transmission mode) in an imager for preparing imaged light according to print data, the print data including a plurality of data bits. The an imager includes a light source for illuminating an object plane, a modulator disposed on the object plane so as to be illuminated by the light source, and an optics system. The light from the light source is imaged, or focused, onto the modulator by the optics system. The modulator includes a plurality of reflective elements, each reflective element corresponding to a respective data bit of the plurality of data bits. Each reflective element is controlled by a corresponding data bit to reflect part of the light from the light source in a first direction as a first light from the respective reflective element when the corresponding data bit is in a first state and part of the light from the light source as a second light when the corresponding data bit is in a second state. The projection system focuses only the first light from the reflective element on an imaging medium as the imaged light.

These and other objects are achieved with a method for projecting imaged light onto an imaging medium according to print data. The method includes the steps of generating light with a light source, imaging the light from the light source onto at least one modulator having a plurality of individually addressable reflective elements, and selectively modulating the reflective elements to reflect light from the light source according to the print data to direct a modulated portion of the light onto the imaging medium.

BRIEF DESCRIPTION OF THE DRAWINGS

The invention will be described in detail in the following description of preferred embodiments with reference to the following figures wherein like reference numerals indicate like parts and wherein.

DESCRIPTION OF PREFERRED EMBODIMENTS

Figure 1:
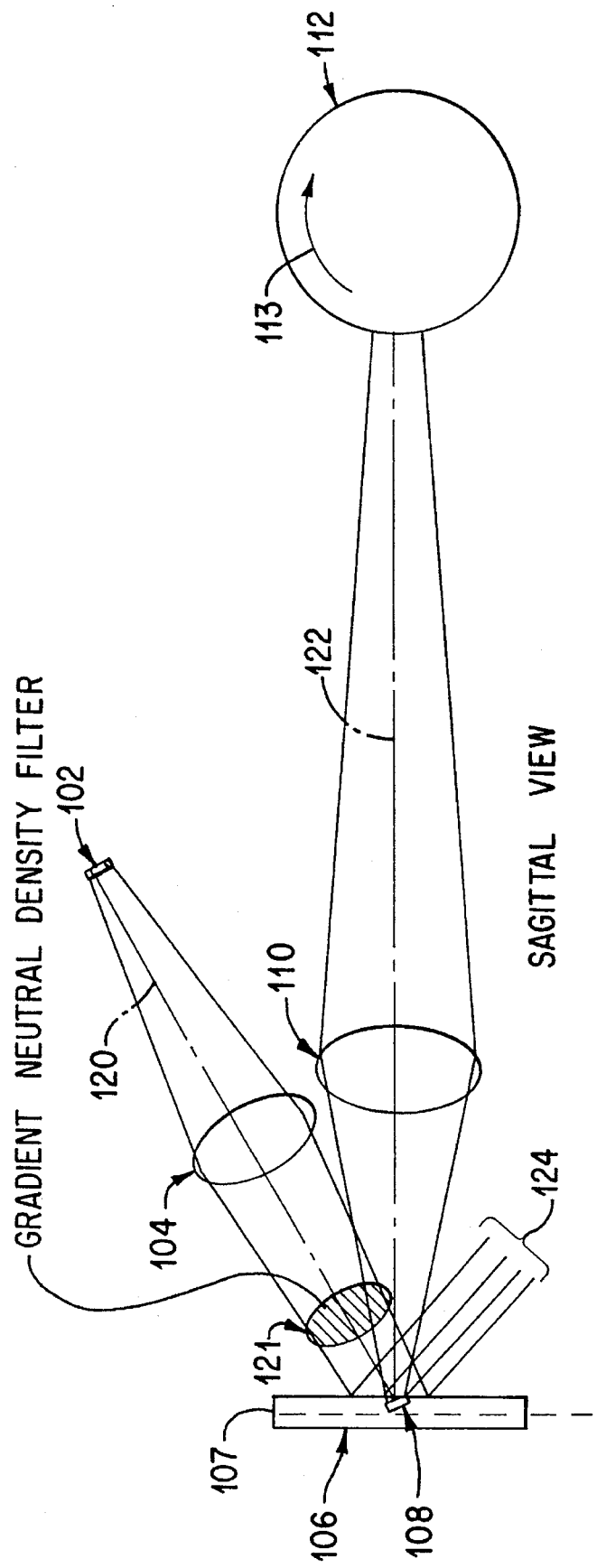
FIG. 1 is a sagittal view of the optics of the imager of the present invention.

In FIG. 1, a light source 102 illuminates modulator 106 through a condenser lens 104. Alternatively, a plurality of modulators may replace the modulator 106. The source light from the light source 102 propagates along a direction 120 to illuminate the modulator 106 at an object plane 107. A projection or imaging lens 110 is disposed between the object plane 107 and an imaging medium 112, for example, a photoreceptor of a printer. The light source 102 is imaged, or focused, onto the modulator 106. Light reflecting from the modulator 106 propagates in a direction 122 to be focused onto the imaging medium 112.

The light source 102 may preferably be one or more gas or diode lasers producing visible or infrared light. The lasers may produce a single spot or multiple spots. The light source 102 may also be a tungsten filament of a incandescent type light. The modulator 106 is preferably uniformly illuminated by the light source 102 and the condenser lens 104.

The imaging medium 112 is preferably a photoreceptor belt or photoreceptor drum rotating in the direction indicated by arrow 113. Thus, an image of the light source 102 is projected along the direction 122 by the imaging lens 110 and imaged on the photoreceptor surface of the photoreceptor 112 as the photoreceptor 112 rotates in direction 113. Thus, a two dimensional image is projected onto photoreceptor 112.

Figure 2:
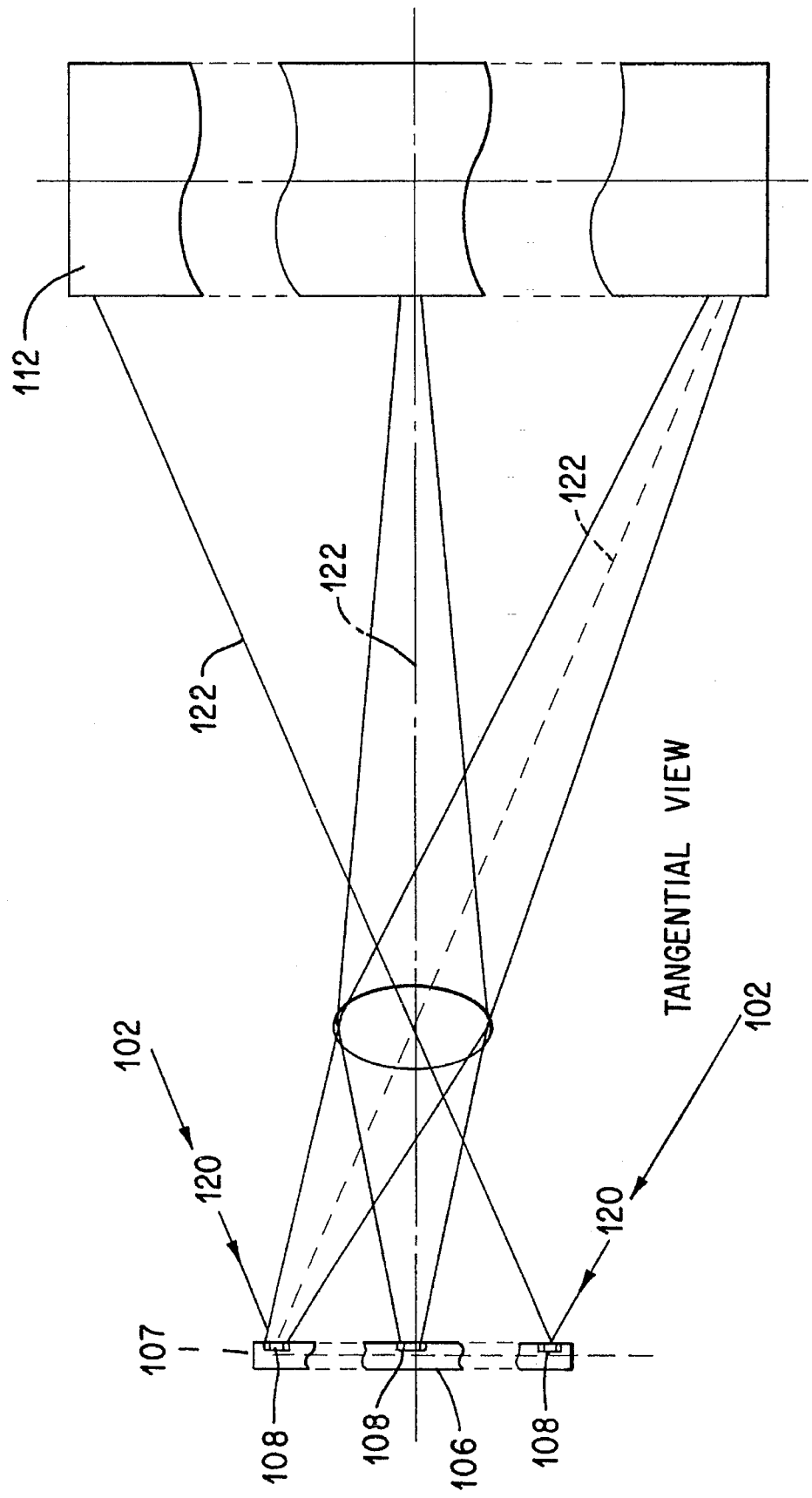
FIG. 2 is a tangential view of the optics of the imager.

As shown in FIG. 2, the modulator 106 is a DMD chip containing a plurality of reflecting elements, i.e., active pixel mirrors 108. Each pixel mirror 108 is individually addressable according to one of a plurality of data bits which constitute the print data. When the data bits are in a first state, the corresponding pixel mirrors 108 are controlled to reflect incident light from the direction 120 toward the photoreceptor along the direction 122. When data bits are in a second state, the corresponding pixel mirrors 108 are controlled to reflect incident light from direction 120 away from the photoreceptor 112 along the direction 124. Light reflected along the direction 124 does not pass through the imaging lens 110, so that light passing along the direction 124 does not illuminate the imaging medium 112. Light passing in the direction 124 is referred to as dark field projection. Thus, each pixel mirror 108 can be controlled to reflect light through the imaging lens 110 to illuminate the imaging medium 112 or alternatively to reflect light along the direction 124 into the dark field.

In FIG. 1, the linear array of pixel mirrors that constitute the modulator 106 selectively reflect light from the source light 102 from the direction 120 into the first direction 122 or the dark field direction 124. The image produced on the imaging medium 112 will appear bright when the light from the light source 102 is reflected along the first direction 122 and will appear dark when the light from the light source 102 is reflected along the dark field direction 124 (dark field projection). In addition, one or more gradient neutral density filters 121 may be disposed between the condenser lens 104 and the imaging lens 110 to uniformly illuminate the modulator 106 and/or the imaging medium 112. The gradient neutral density filter 101 may be disposed between condenser lens and the modulator 106 or between the modulator 106 and the imaging lens 110.

In FIG. 2, the modulator 106 is positioned at the object plane 107. Light from the light source 102 traveling along the first direction 120 reflects from the modulator 106 through the imaging lens 110 onto the imaging medium 112. In particular, the modulator 106 includes a plurality of controllable pixel mirrors 108. Each mirror 108 is individually addressable according to a corresponding data bit to reflect light through the imaging lens 110 when the corresponding data bit is in a first state. Thus, each separate pixel mirror 108 reflects light along a corresponding direction 122 and onto a corresponding portion of the imaging medium 112. Thus, a linear array of controllable mirrors 108 forming the modulator 106 causes the light from the source light 102 to be reflected through the imaging lens 110 onto the imaging medium 112 when the corresponding data bit is in a first state. When different data bits are in first or second states, the light projected along the correspondingly different projection directions 122 or 124 will either be bright or appear dark, respectively, depending on the respective data bit. Thus, a linear array of "dots" are projected onto the imaging medium 112. As the imaging medium 112 rotates, different print data are provided to control the modulator 106 to produce different linear arrays of imaged light (array of dots) focused on the imaging medium 112. As the imaging medium 112 rotates, the linear array of imaged light sweeps out a two dimensional image.

Figure 3A:
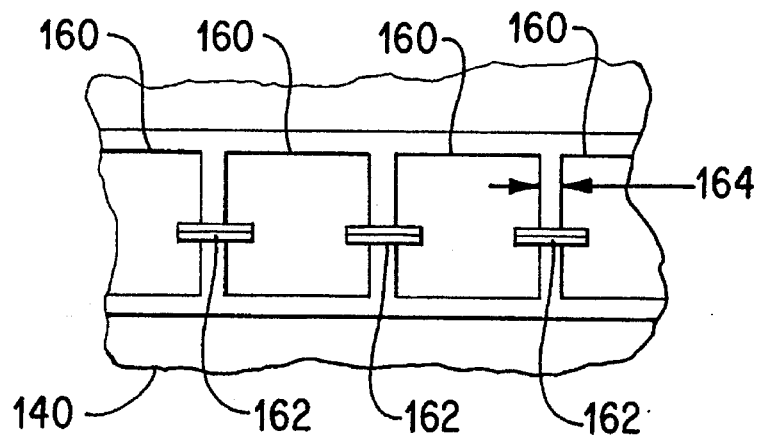
FIG. 3A is a view of a single row modulator using DMDs.

In FIG. 3A, a linear array of deformable mirror devices 160 pivot along pivot members 162 in response to the status of corresponding data bits. The pixel mirrors 160 are separated from each other by a minimal gap 164. Collectively, the pixel mirrors form linear array 140.

Figure 3B:
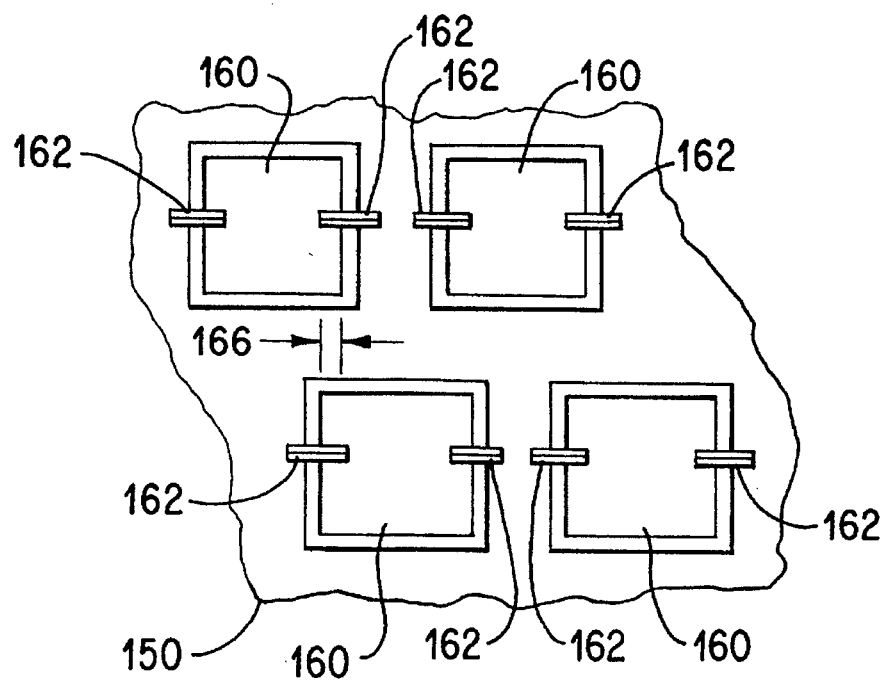
FIG. 3B is a view of a two-row modulator using DMDs.

In FIG. 3B, the modulator 106 includes a two-row array 150 of pixel mirrors 160 selectively pivotable about pivot members 162. A pixel mirror 160 in the first row overlaps a corresponding pixel mirror 160 in the second row by overlap distance 166. In contrast, pixel mirrors 160 are separated by gap 164 in the linear array 140 of pixel mirrors in FIG. 3A. Thus, the DMD designer may respond to the overlap requirements of the optics designer. The minimum gap is limited by the manufacturing process. A slight light energy "overfill", in the areas surrounding the active modulator surfaces of the DMD or similar device relaxes the precision requirements on the positional alignment in the illumination system.

Figure 4A:
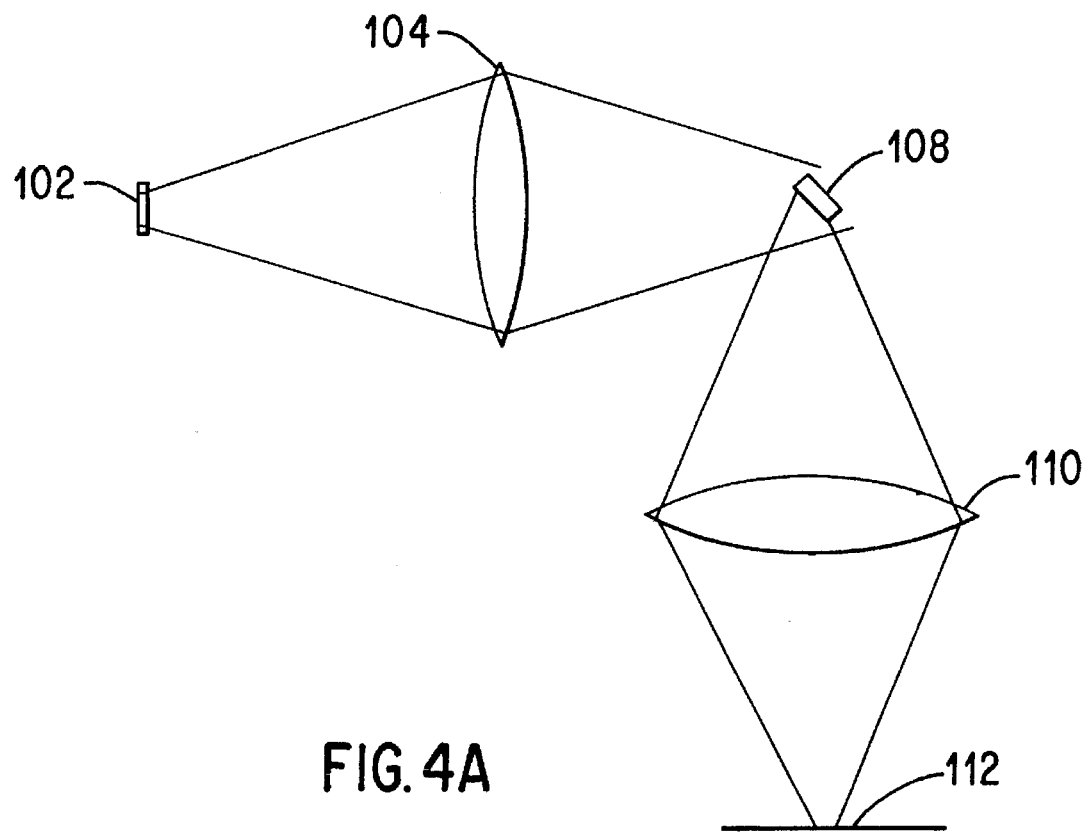
FIG. 4A shows an optical schematic of the present invention.

In FIG. 4A, an optical schematic of the system shows the light source 102 projecting light through the condenser lens 104 onto the pixel mirrors 108, which in turn reflect light through the imaging lens 110 onto imaging medium 112. The system is preferably designed to maximize the portion of the light illuminating the pixel mirrors 108. In a preferred embodiment of the invention, the numerical aperture of the condenser lens 104 is set to be equal to a numerical aperture of the imaging lens 110, thus critically illuminating the modulator 106. By employing this critical illumination method, where the light source 102 is imaged onto the modulator 106, all of the light reflected from the "on" mirrors is reflected into the imaging lens aperture because the numerical aperture of the condenser lens 104 matches the numerical aperture of the imaging lens 110. As is well known, the numerical aperture of a lens is equal to $$\frac{1}{2 \times f\#}.$$

Using critical illumination maximizes the energy throughput of the light source 102 by completely filling the aperture of the imaging lens with the reflected light, allowing for a less powerful light source 102 than would otherwise be required.

Figure 4B:
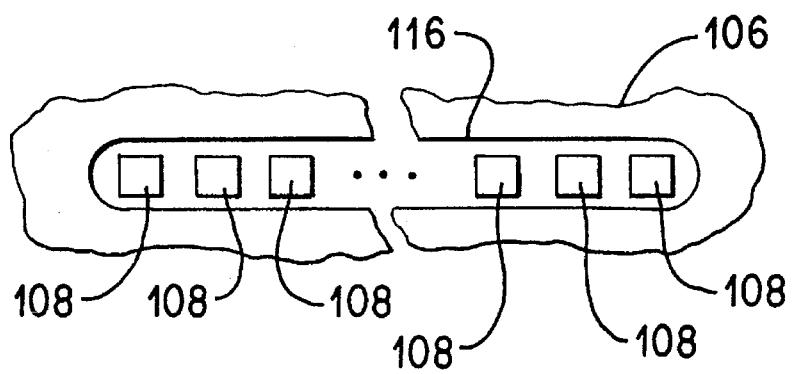
FIG. 4B shows a view of the object plane containing a critically modulator.

As shown in FIG. 4B, the light from the light source 102 illuminating the modulator 106 may be confined to a shape 116 which closely conforms to the shape of the array of pixel mirrors 108, arranged in either a linear array or a multiple row array. It is desirable to focus a maximum percentage of the light onto the pixel mirrors 108 while focusing a minimum percentage of the light onto the background of the modulator 106. Note the elongated shape 116 conforms well with the shape of an elongated tungsten filament of an incandescent lamp or an elongated laser diode.

In spite of careful design, some of the source light will illuminate regions of the modulator 106 which are not covered by a pixel mirror 108. The imager is arranged so that such light is reflected along direction 124 as shown in FIG. 1. This light is referred to as dark field projection. Only those pixel mirrors 108 which are addressed by a data bit in a first state will reflect light in the first direction 122 into the imaging lens 110. Therefore, high contrast is achieved.

As can be seen in FIG. 2, the projection system may be designed so that a width of the modulator 106 may be small, for example two inches, when compared to the width of the imaging medium, for example, an 8½inch photoreceptor 112. Furthermore, the imaging lens 110 precisely focuses each pixel mirror 108 onto a corresponding portion of the imaging medium 112. Therefore, when each pixel mirror 108 is controlled by a corresponding data bit to reflect light from the light source 102 through the imaging lens 110 onto the imaging medium 112, the image projected will be very bright. In contrast, when the pixel mirror 108 is controlled by the corresponding data bit to reflect the light from the source light 102 along the dark field direction 124, as shown in FIG. 1, therefore, no light energy will arrive at photoreceptor 112.

Since the pixel mirrors 108 have fixed positions, the image projected by the pixel mirrors onto the imaging medium 112 are also fixed, thus minimizing pixel placement error on the imaging medium 112. Since this imaging system has inherent high contrast, precise pixel placement and good registration of multiple layer images due to using the modulator 106, this system is particularly well suited for color printing.

This imaging system permits high energy density light from the light source 102 to be directed to the mirror surfaces 108 and causes all the light reflected by the mirror surfaces in the first direction 122 to be directed onto the aperture of the imaging lens 110 in an economical and efficient manner to ensure sufficient light power to fully expose the photoreceptor 112. This high energy density is achievable independently of the type of the light source 102 being used. Therefore, as the photoreceptor 112 rotates, the print data may be rapidly modulated to achieve high density imaging on the photoreceptor 112. By employing this critical illumination apparatus and method, where the light from the light source 102 is imaged on the modulator 106 and the numerical aperture of the condenser lens 104 is equal to the numerical aperture of the imaging lens 110, all of the light from the mirrors is reflected onto the photoreceptor 112.

Figure 5A:
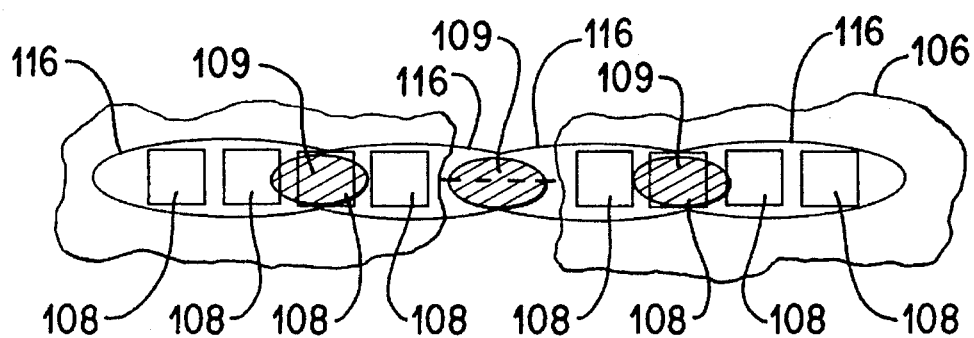
FIG. 5A shows a view of the object plane contaiing an illuminated modulator.

FIG. 5A shows an alternative method of uniformly illuminating modulator 106 with a plurality of light sources 102. A plurality of light beams (also referred to as image radiation patterns) 116 are illuminated onto modulator 106. Each of the image radiation patterns 116 is illuminated onto a plurality of the pixel mirrors 108. The image radiation patterns 116 are overlapped at overlap areas 109 so that uniform illumination of the modulator is achieved in a very efficient manner.

Figure 5B:
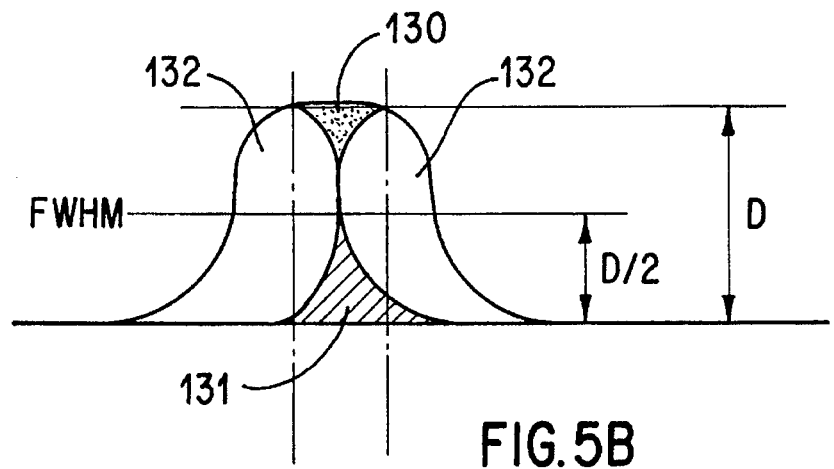
FIG. 5B is a Gaussian distribution of two of the image radiation patterns shown in FIG. 5A.

FIG. 5B shows a Gaussian distribution of two of the overlapped image radiation patterns 116 shown in FIG. 5A. Each of the image radiation patterns 116 is represented by an individual bell curve 132. The image radiation patterns 116 are overlapped at their full width half max (FWHM) points, as shown in FIGS. 5A and 5B. The overlapping portion 109 is represented in the Gaussian distribution shown in FIG. 5B by region 131. By overlapping the image radiation patterns 116 at the FWHM point, uniform distribution is created at the point where the image radiation patterns overlap, as represented by area 130, which shows the result of the superposition of the bell curves.

Figure 5C:
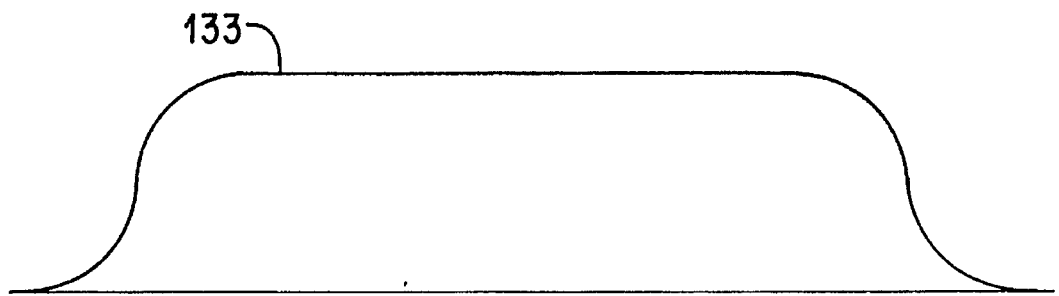
FIG. 5C is a Gaussian distribution of more than two of the image radiation patterns shown in FIG. 5A.

FIG. 5C shows a Gaussian distribution of a larger number of overlapped image radiation patterns 116 than is shown in FIG. 5B. By using a plurality of light sources overlapped at their FWHM points, uniform illumination is achieved across all pixel mirrors 108 of modulator 106. Such a uniform illumination across the modulator is illustrated by the Gaussian distribution of image radiation pattern shown in FIG. 5C.

Having described preferred embodiments of a novel method and apparatus for the preparing and modulating imaged light according to print data (which are intended to be illustrative and not limiting), it is noted that modifications and variations can be made by those skilled in the art in light of the above teachings. It is therefore to be understood that changes may be made in the particular embodiments of the invention disclosed which are within the scope and spirit of the invention as defined by the appended claims.

What is claimed is:

1. An imaging device for projecting imaged light, modulated in response to print data, onto an imaging medium, the imaging device comprising:

a light source;

a condenser lens receiving light from the light source;

at least one modulator having a plurality of individually addressable reflective elements, wherein the condenser lens images the light source onto the at least one modulator and the at least one modulator selectively redirects a portion of the light; and an imaging lens positioned to receive the portion of the light, the imaging lens focusing the portion of light onto the imaging medium, wherein a numerical aperture of the condenser lens is equal to a numerical aperture of the imaging lens so that the modulator is critically illuminated.

2. The imaging device according to claim 1, wherein the imaging lens is positioned between the at least one modulator and the imaging medium.

3. The imaging device according to claim 1, wherein the light source comprises at least one laser diode.

4. The imaging device according to claim 1, further comprising a gradient neutral density filter disposed between the condenser lens and the at least one modulator so that the imaging medium is uniformly illuminated by the light.

5. The imaging device according to claim 1, further comprising a gradient neutral density filter positioned between the at least one modulator and the imaging medium.

6. The imaging device according to claim 1, further comprising a gradient neutral density filter disposed between the condenser lens and the at least one modulator and between the at least one modulator and the imaging medium.

7. The imaging device according to claim 1, wherein the light source comprises a plurality of light emitting elements.

8. The imaging device according to claim 7, condenser lens images the plurality of light emitting elements onto the plurality of individually addressable reflective elements so that light from each of the plurality of light emitting elements is overlapped to uniformly illuminate the reflective elements.

9. The imaging device according to claim 7, wherein the condenser lens images the plurality of light emitting elements onto the plurality of reflective elements so that light beams from the plurality of light emitting elements are overlapped on the plurality of reflective elements at a full width half max point of the light beams.

10. An optics system controlling light directed from a light source to an imaging medium, the optics system comprising:

a condenser lens positioned to receive light from the light source;

at least one modulator having a plurality of individually addressable reflective elements, wherein the condenser lens images the light source onto the at least one modulator and the at least one modulator selectively redirects portions of the light in a first direction according to the print data; and an imaging lens positioned to receive the redirected portions of the light, the imaging lens focusing the received portions of the light onto the imaging medium, wherein a numerical aperture of the condenser lens is equal to a numerical aperture of the imaging lens so that the modulator is critically illuminated.

11. The optics system of claim 10, wherein the light source comprises at least one laser diode.

12. The optics system of claim 10, further comprising a gradient neutral density filter positioned between the condenser lens and the modulator so that the imaging medium is uniformly illuminated by the light.

13. The optics system of claim 10, further comprising a gradient neutral density filter positioned between the modulator and the imaging medium.

14. The optics system of claim 10, further comprising a gradient neutral density filter positioned between the condenser lens and the at least one modulator and between the at least one modulator and the imaging medium.

15. The optics system of claim 10, wherein the light source comprises a plurality of light emitting elements.

16. The optics system of claim 15, wherein the condenser lens images the plurality of light emitting elements onto the plurality of individually addressable reflective elements so that light from each of the plurality of light emitting elements is overlapped to uniformly illuminate the reflective elements.

17. The optics system of claim 15, wherein the condenser lens images the plurality of light emitting elements onto the plurality of reflective elements so that light beams from the plurality of light emitting elements are overlapped at a full width half max point of the light beams.

18. A method of projecting imaged light onto an imaging medium according to print data, the method comprising the steps of:

generating light with a light source;

imaging the light source through a condenser lens onto at least one modulator, the at least one modulator having a plurality of individually addressable reflective elements;

selectively modulating light from the light source according to the print data to direct a modulated portion of the light through an imaging lens onto the imaging medium; and critically illuminating the at least one modulator by setting a numerical aperture of the condenser lens equal to a numerical aperture of the imaging lens.

19. The method of claim 18, wherein the step of imaging the light source through a condenser lens onto at least one modulator includes uniformly illuminating the at least one modulator by passing the light through a gradient neutral density filter located between the condenser lens and the at least one modulator.

20. The method of claim 18, further including the step of uniformly imaging the modulated portion of the light onto an aperture of the imaging lens with a gradient neutral density filter positioned between the condenser lens and the imaging lens.

21. The method of claim 18, wherein the light source includes a plurality of light emitting elements.

22. The method of claim 21, wherein the step of imaging the plurality of light emitting elements onto at least one modulator includes imaging beams generated by the plurality of light emitting elements onto the plurality of reflective elements.

23. The method of claim 22, further comprising the step of overlapping the beams on the plurality of reflective elements to uniformly illuminate the plurality of reflective elements.

24. The method of claim 23, wherein the plurality of beams are overlapped on the plurality of reflective element at a full width half max point of each of the plurality of beams.

* * * * *